(12) United States Patent
Kamada et al.

(10) Patent No.: US 12,052,396 B1
(45) Date of Patent: Jul. 30, 2024

(54) SYSTEM AND CONTROL METHOD FOR PRIORITIZING FUNCTIONS OF AN IMAGE FORMING APPARATUS

(71) Applicant: Toshiba Tec Kabushiki Kaisha, Tokyo (JP)

(72) Inventors: Jin Kamada, Izunokuni Shizuoka (JP); Masataka Fushimi, Shizuoka Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/178,285

(22) Filed: Mar. 3, 2023

(51) Int. Cl.
*H04N 1/00* (2006.01)

(52) U.S. Cl.
CPC ..... *H04N 1/00474* (2013.01); *H04N 1/00244* (2013.01); *H04N 1/00307* (2013.01); *H04N 1/00477* (2013.01); *H04N 1/00689* (2013.01); *H04N 1/00771* (2013.01); *H04N 2201/0094* (2013.01)

(58) Field of Classification Search
CPC ........... H04N 1/00244; H04N 1/00307; H04N 1/0032; H04N 1/00408; H04N 1/00411; H04N 1/00427; H04N 1/00474; H04N 1/00477; H04N 1/00501; H04N 1/00503; H04N 1/00506; H04N 1/00663; H04N 1/00689; H04N 1/00745; H04N 1/00771; H04N 1/00779; H04N 1/00782; H04N 1/00801; H04N 1/00803; H04N 1/00814; H04N 1/00928; H04N 1/32539; H04N 2201/0072; H04N 1/00482; H04N 1/00681–00705; H04N 1/00742–00758; H04N 1/00763; H04N 1/00774; G06K 15/1805; G06K 15/402; G06F 3/1205; G06F 3/1222; G06F 3/1238; G06F 3/1253; G06F 3/1255; G06F 3/1258
See application file for complete search history.

(56) References Cited

U.S. PATENT DOCUMENTS

| | | | |
|---|---|---|---|
| 7,852,497 B2 * | 12/2010 | Sato | G06F 3/1208 358/1.14 |
| 8,526,040 B2 * | 9/2013 | Okada | H04N 1/00222 358/1.15 |
| 9,229,663 B2 * | 1/2016 | Yoshida | G06F 3/1238 |
| 10,268,934 B2 * | 4/2019 | Fukumoto | G06K 15/1805 |
| 10,664,213 B2 * | 5/2020 | Mukai | G06F 3/1222 |
| 10,904,402 B2 * | 1/2021 | Shibukawa | G06F 3/04817 |
| 10,908,860 B1 * | 2/2021 | Anshu | G06F 3/1263 |
| 10,951,780 B2 * | 3/2021 | Yamauchi | H04N 1/00663 |

(Continued)

FOREIGN PATENT DOCUMENTS

| | | | |
|---|---|---|---|
| JP | 2008154184 A | * | 7/2008 |
| JP | 2020-107125 A | | 7/2020 |
| JP | 2021-099672 A | | 7/2021 |

*Primary Examiner* — Scott A Rogers
(74) *Attorney, Agent, or Firm* — FOLEY & LARDNER LLP

(57) ABSTRACT

An image forming apparatus includes a processing circuit. The processing circuit is configured to acquire setting information registered in advance by the user, determine a display mode of a list display of the setting information according to a priority assigned to the setting information or whether a job applying the setting information is executed, and control a display device to display the list display based on the display mode.

12 Claims, 7 Drawing Sheets

| OPERATION ID | FUNCTION |
|---|---|
| 1 | COPY |
| 3 | SCAN |
| 2 | PRINT |

(56) References Cited

U.S. PATENT DOCUMENTS

| | | | |
|---|---|---|---|
| 11,218,608 B2 | 1/2022 | Watariuchi | |
| 11,307,821 B2 * | 4/2022 | Otsuka | G06F 3/126 |
| 11,645,023 B2 * | 5/2023 | Ogawa | G06F 3/1229 |
| | | | 358/1.15 |
| 2008/0246989 A1 * | 10/2008 | Konuma | G03G 15/5016 |
| | | | 358/1.15 |
| 2011/0235130 A1 * | 9/2011 | Okada | H04N 1/10 |
| | | | 345/173 |
| 2014/0253980 A1 * | 9/2014 | Arai | H04N 1/00222 |
| | | | 358/474 |
| 2015/0092220 A1 * | 4/2015 | Matsunaga | G06F 21/608 |
| | | | 358/1.14 |
| 2023/0053705 A1 * | 2/2023 | Fukuchi | G06F 3/1267 |

* cited by examiner

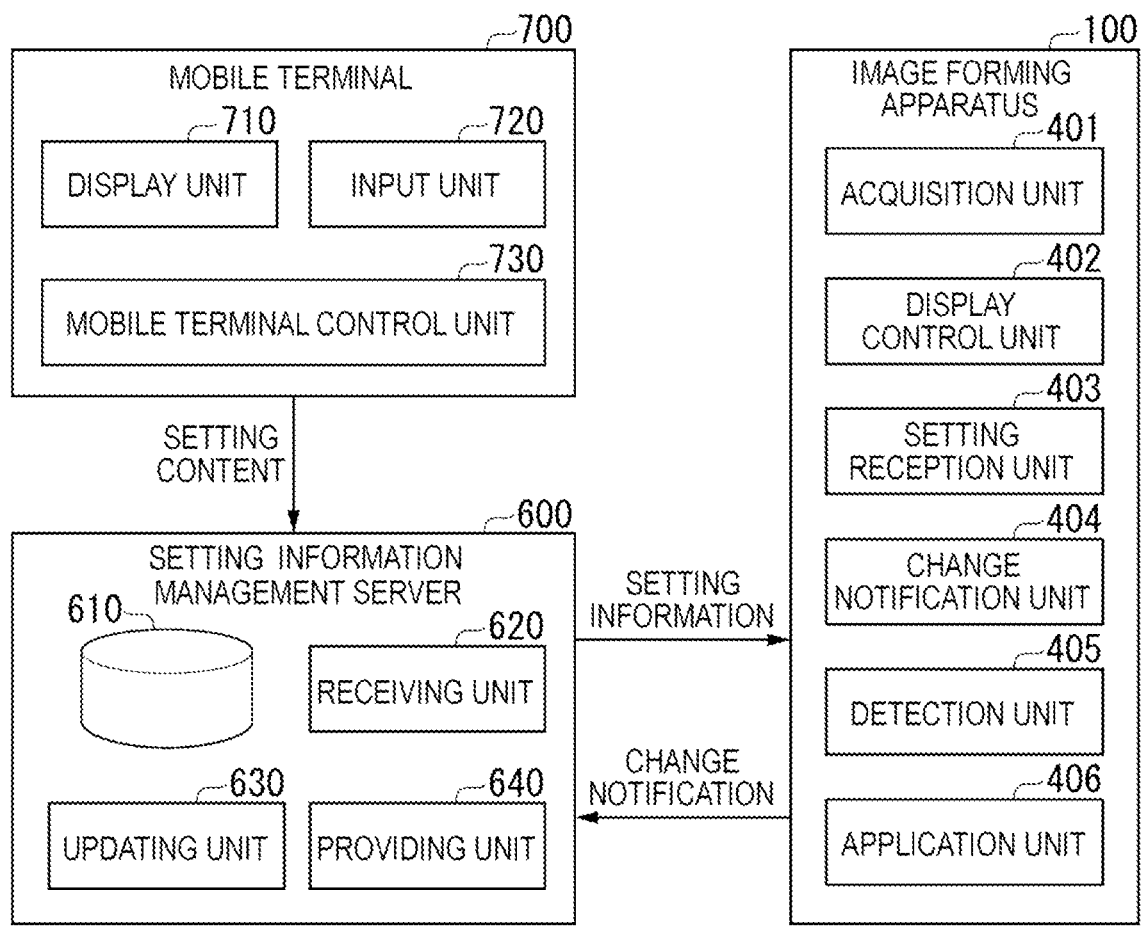

FIG. 6

| OPERATION ID | PRIORITY | FUNCTION |
|---|---|---|
| 1 | 1 | COPY |
| 2 | -1 | PRINT |
| 3 | 2 | SCAN |
| ... | ... | ... |

FIG. 7

SELECT FUNCTION TO PREPARE IN ADVANCE

○ COPY

● SCAN

○ PRINT

○ APPLICATION

[CANCEL]   [OK]

FIG. 8

COLOR SETTING

○ COLOR

● GRAYSCALE

○ MONOCHROME

...

[CANCEL]   [SEND]

FIG. 9

| OPERATION ID | FUNCTION |
|---|---|
| 1 | COPY |
| 3 | SCAN |
| 2 | PRINT |

FIG. 10

| OPERATION ID | FUNCTION |
|---|---|
| 1 | COPY |
| 2 | PRINT |

FIG. 11

| OPERATION ID | FUNCTION |
|---|---|
| 1 | COPY |
| 3 | SCAN |

SYSTEM AND CONTROL METHOD FOR PRIORITIZING FUNCTIONS OF AN IMAGE FORMING APPARATUS

FIELD

Embodiments described herein relate generally to an image forming apparatus, a setting information management system, and a control method of the same.

BACKGROUND

An image forming apparatus is provided with various settings for each function of the image forming apparatus. Some image forming apparatuses in the related art are provided with a function of pre-storing information on the settings, but it is difficult to say that it is easy to use.

A technology capable of improving usability for a user with various settings of the image forming apparatus is provided.

DESCRIPTION OF THE DRAWINGS

FIG. 4 is a diagram illustrating a functional configuration of the image forming apparatus;

FIG. 5 is a diagram illustrating an example of a setting information database;

FIG. 6 is a diagram illustrating an example of an additional information database;

FIG. 7 is a diagram illustrating an example of a screen displayed on a mobile terminal;

FIG. 8 is a diagram illustrating an example of a screen displayed on the mobile terminal;

FIG. 9 is a diagram illustrating an example of a list display if all setting information is displayed;

FIG. 10 is a diagram illustrating an example of the list display if a change due to a manual feed tray is detected;

FIG. 11 is a diagram illustrating an example of the list display in which the setting information applied in the executed job is not displayed in the list display;

DETAILED DESCRIPTION

In general, according to one embodiment, an image forming apparatus includes an acquisition unit and a display control unit. The acquisition unit indicates settings of the image forming apparatus and acquires setting information registered in advance by the user. When displaying a list display of the acquired setting information, the display control unit determines a display mode of the list display according to priority assigned to the setting information or whether the job applying the setting information is executed.

The image forming apparatus according to an embodiment can provide a technique capable of improving usability for a user with various settings of the image forming apparatus. The image forming apparatus according to the embodiment will be described in detail below.

Figure 1:
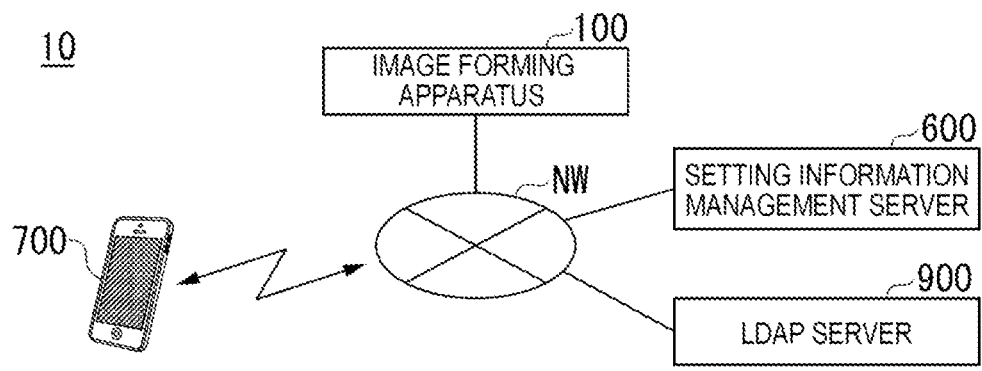
FIG. 1 is a diagram illustrating an overall configuration of a setting information management system according to an embodiment.

FIG. 1 is a diagram illustrating an overall configuration of a setting information management system 10 including an image forming apparatus 100 according to an embodiment.

The setting information management system 10 includes the image forming apparatus 100, a setting information management server 600, a mobile terminal 700, and a Lightweight Directory Access Protocol (LDAP) server 900, which are connected via a network NW. The network NW includes the Internet, a mobile phone line, a local area network (LAN), and the like.

The image forming apparatus 100 is an image forming apparatus used by a user. FIG. 1 illustrates only one image forming apparatus 100, but there may be one or more image forming apparatuses. The mobile terminal 700 is an example of the user terminal, and may be a smart phone, for example. Using the mobile terminal 700, the user can register in advance the setting information indicating settings of the image forming apparatus 100. Although only one mobile terminal 700 is illustrated, there may be one or more mobile terminals. The setting information management server 600 is a server that manages the setting information registered by the user. The LDAP server 900 is used for user authentication and the like.

Figure 2:
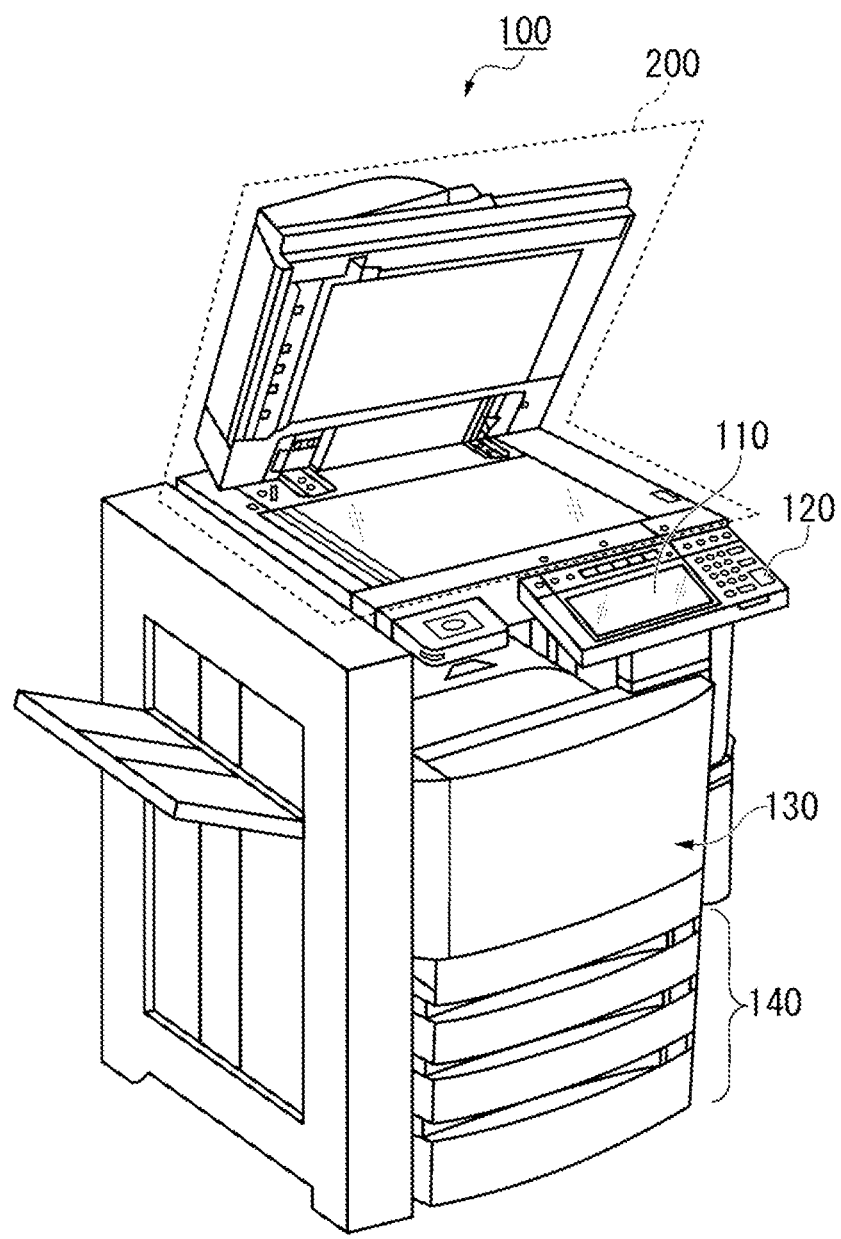
FIG. 2 is an external diagram illustrating an example of an overall configuration of an image forming apparatus.
Figure 3:
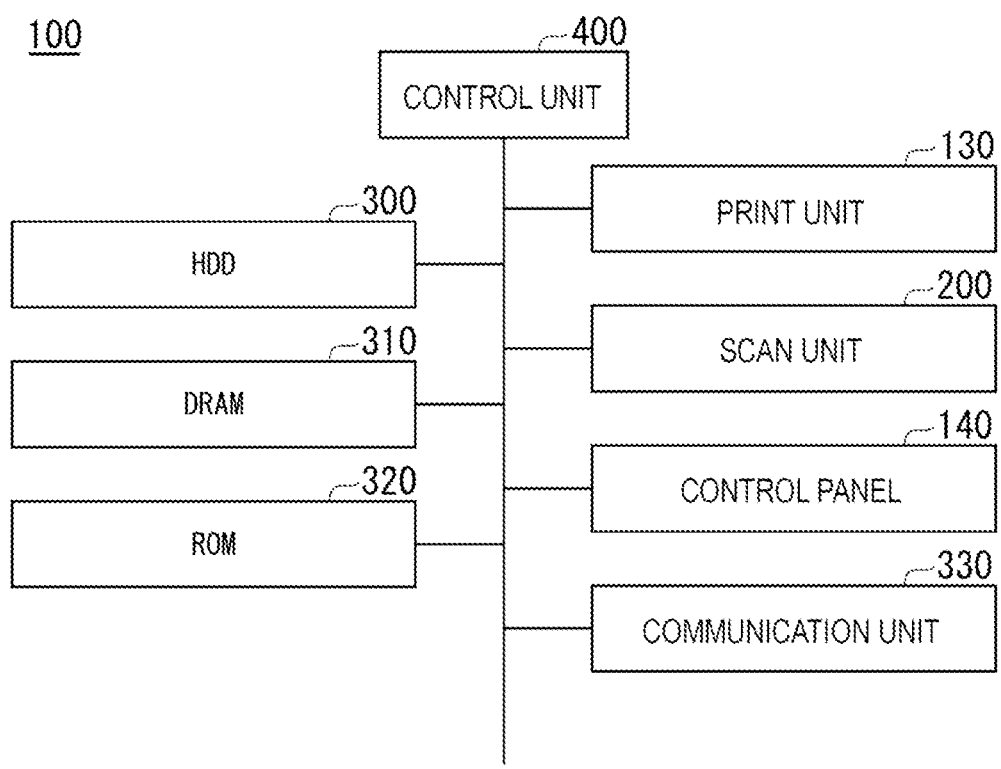
FIG. 3 is a diagram illustrating a configuration of a control system of the image forming apparatus.

FIG. 2 is an external diagram illustrating an example of the overall configuration of the image forming apparatus 100 according to the embodiment. The image forming apparatus 100 is a multifunction machine, for example. The image forming apparatus 100 includes a display 110, a control panel 120, a print unit 130 (a printer), a sheet storage unit 140 and a scan unit 200 (a scanner). In addition, the image forming apparatus 100 includes a control unit 400 (a controller, a control system, a processing circuit, etc.) that controls the apparatus as a whole, as illustrated in FIG. 3.

The image forming apparatus 100 forms an image on a sheet using a developer. The developer is a toner, for example. In the following description, the toner will be described as the developer. The sheet is paper or label paper, for example. The sheet may be any material on which the image forming apparatus 100 can form an image.

The display 110 is an image display device such as a Liquid Crystal Display (LCD), an organic Electro Luminescence (EL) display, or the like. The display 110 displays various information of the image forming apparatus 100. The display 110 is an example of a display unit.

The control panel 120 includes a plurality of buttons. The control panel 120 receives user operations. The control panel 120 outputs a signal corresponding to the operation input by the user to the control unit 400 of the image forming apparatus 100. It is to be noted that the display 110 and the control panel 120 may be configured as an integrated touch panel.

The print unit 130 prints an image on the sheet based on image information generated by the scan unit 200 or image information received via the network. The print unit 130 prints an image using the toner. It is to be noted that the sheet on which the image is printed may be a sheet stored in the sheet storage unit 140 or a sheet placed on a manual feed tray. The sheet storage unit 140 stores sheets to be used for image formation in the print unit 130. It is to be noted that the manual feed tray is usually integrated with a housing of the image forming apparatus 100. If the manual feed tray is used, the user can pull out the manual feed tray from the image forming apparatus 100 for use.

The scan unit 200 reads the image information of a read object based on the brightness and darkness of light. The scan unit 200 scans a sheet placed on an Auto Document Feeder (ADF) or a sheet placed on a platen glass. The scan unit 200 records the read image information. The recorded image information may be transmitted to another information processing apparatus via the network. The recorded image information may be formed as an image on the sheet by the print unit 130.

FIG. 3 is a diagram illustrating the configuration of the control system of the image forming apparatus 100.

The image forming apparatus 100 includes the print unit 130, the scan unit 200, the control panel 120, a communication unit 330, the control unit 400, a Hard Disk Drive (HDD) 300, a Dynamic Random Access Memory (DRAM) 310, and a Read Only Memory (ROM) 320. These units are connected via a system bus.

The control unit 400 controls the units connected via the system bus. The ROM 320 stores various control programs necessary for the operation of the image forming apparatus 100. The ROM 320 stores programs for controlling image forming operations and the like. The HDD 300 stores the programs and data. Each program stored in the ROM 320 and the HDD 300 is executed under the control of the control unit 400. The DRAM 310 is a buffer memory that temporarily stores data generated as the program is executed.

The communication unit 330 is a group of devices for the image forming apparatus 100 to perform communication (communication using wired LAN, wireless LAN, Universal Serial Bus (USB), Bluetooth (registered trademark), and the like) with other devices.

FIG. 4 is a diagram illustrating the functional configuration of the image forming apparatus 100. In addition to the functional configuration of the image forming apparatus 100, FIG. 4 also illustrates the functional configuration of the setting information management server 600 and the mobile terminal 700. Each function illustrated in FIG. 4 is implemented by, for example, a hardware processor such as a Central Processing Unit (CPU) executing a program (software). Some or all of these components may be implemented by hardware (including circuitry) such as Large Scale Integration (LSI), Application Specific Integrated Circuit (ASIC), Field-Programmable Gate Array (FPGA), and Graphics Processing Unit (GPU), and may be implemented by cooperation of software and hardware. The program may be stored in advance in a storage device (storage device including a non-transient storage medium) such as a Hard Disk Drive (HDD), Solid State Drive (SSD), or flash memory, or the program may be stored in a removable storage medium (non-transient storage medium) such as a DVD or a CD-ROM and installed upon loading the storage medium to a drive device.

The image forming apparatus 100 includes an acquisition unit 401, a display control unit 402, a setting reception unit 403, a change notification unit 404, a detection unit 405 and an application unit 406. The acquisition unit 401 indicates settings of the image forming apparatus 100 and acquires, from the setting information management server 600, the setting information registered in advance by the user. When displaying a list display of the acquired setting information, the display control unit 402 determines a display mode of the list display according to the priority assigned to the setting information or whether the job applying the setting information is executed. The list display is displayed on the display 110.

In addition, the display control unit 402 determines the display mode of the list display according to the priority assigned to the setting information, which will be described below. Furthermore, the display control unit 402 does not display the setting information in the list if the job applying that setting information is executed, or displays the setting information as the setting information assigned with the lowest priority.

The setting reception unit 403 receives the setting input by the user through the control panel 120. The setting information indicating the received setting is applied to a job to be executed by the image forming apparatus 100 or notified to the setting information management server 600.

The change notification unit 404 notifies the setting information management server 600 that the setting information is changed by the user or that execution completion information is changed, which will be described below. The detection unit 405 detects a change in the state of the image forming apparatus 100 caused by the user. Specifically, a detection unit 504 detects that a sheet is placed on the ADF or the platen glass of the scan unit 200 of the image forming apparatus 100. Further, the detection unit 504 detects that the manual feed tray is pulled out. The application unit 406 applies the setting information selected by the user from among the setting information displayed in the list display to the image forming apparatus 100. The applied setting information is reflected in the job.

The mobile terminal 700 includes a display unit 710 (a display), an input unit 720 and a mobile terminal control unit 730 (a controller, a control system, etc.). The display unit 710 includes an LCD, an organic EL, or the like, for example. The input unit 720 includes a touch panel, hard keys, or the like. The mobile terminal control unit 730 includes an arithmetic device and a storage device, and controls the mobile terminal 700 as a whole.

The setting information management server 600 includes a plurality of databases 610, a receiving unit 620 (a communications interface, a transceiver, etc.), an updating unit 630 and a providing unit 640. The database 610 will be described below. The receiving unit 620 receives the setting information input to the mobile terminal 700. When notified by the image forming apparatus 100 that the setting information is changed, the updating unit 630 updates the setting information according to the change. When notified that the job applying the setting information is executed, the updating unit 630 updates the execution completion information. The providing unit 640 provides the setting information received by the receiving unit to the image forming apparatus 100.

Next, the database will be explained. FIG. 5 is a diagram illustrating an example of the setting information database which is one of the databases 610. The setting information database is an example of the setting information, and is provided for each user. The setting information database includes an operation ID, an order, a Uniform Resource Locator (URL), and a setting content.

The operation ID is identification information for uniquely identifying the user setting information. The order indicates the order of setting. The URL indicates the URL of the setting screen. The setting content indicates the setting content of the setting screen corresponding to the URL.

The relationship between the URL and the setting screen will be described in detail. In the present embodiment, a user interface displayed on the display 110 of the image forming apparatus 100 is implemented as a web application, and all screen transitions are managed with URLs. There also is a mechanism for externally (via Application Programming Interface (API)) changing the setting items that can be set in the user interface. Therefore, the screen transition in the user interface displayed on the mobile terminal 700 is managed with the URLs as in the user interface displayed on the image forming apparatus 100.

When acquiring the setting information described above, the image forming apparatus 100 reflects the information in the job, by assuming that the setting is performed up to the last order ("2" in FIG. 5) on the screen corresponding to the URL.

FIG. 6 is a diagram illustrating an example of an additional information database which is one of the databases 610. The additional information database includes an operation ID, a priority, and a function. The additional information indicates the priority of the setting information indicated by the operation ID and the function of the job applying the setting information. The priority information indicates the order of display in the list display on the image forming apparatus 100. The priority is indicated by an integer of 1 or more. A smaller value indicates a higher priority. If the priority is a negative value, it indicates that the priority is lower than all the other tasks with the priority of 1 or higher. Therefore, the example of FIG. 6 illustrates the higher priority in the order of operation IDs 1, 3, and 2. If the job applying the setting information is executed, a negative value is input in the priority column for the setting information.

In addition, regarding the function, the example of FIG. 6 shows that the setting information of operation ID 1 is applied to copy, the setting information of operation ID 2 is applied to print, and the setting information of operation ID 3 is applied to scan.

In the present embodiment, a change in the state of the image forming apparatus 100 caused by the user is detected, and the display mode of the list display is determined according to the detected change in the state of the image forming apparatus 100. The "change" in the state indicates a change that the sheet is placed on the ADF, for example. By the fact that the sheet is placed on the ADF, it is considered that the user is attempting to copy or scan. Another example of the "change" is a change that the sheet is placed on the platen glass. By the fact that the sheet is placed on the platen glass, it is considered that the user is attempting to copy or scan. Still another example of the "change" is a change that the manual feed tray is pulled out of the image forming apparatus 100. By the fact that the manual feed tray is pulled out, it is considered that the user is attempting to copy or print.

As described above, the function the user wants to perform is narrowed down according to the change in the state of the image forming apparatus 100 caused by the user. Therefore, by associating the state changes with the functions in advance, it is possible to determine the display mode of displaying the setting information as a list. As a result, it is possible to improve usability for the user with various settings.

Since the operation by the user such as setting the sheet on the ADF is detected by the control unit 400 and the state is managed accordingly, the state (e.g., communication format such as REST API) of the image forming apparatus 100 is checked by the application program (a program such as an embedded application that runs by allocating a CPU process in the image forming apparatus 100) that executes the process according to the present embodiment. Alternatively, the state of the image forming apparatus 100 can be checked by transmitting an event notification from the image forming apparatus 100 to the application if the state changes (data such as {"event name": "paper set in adf", "time": "2022/11/16 13:56:46.111"} is transmitted from the image forming apparatus 100 to the application).

FIGS. 7 and 8 are diagrams illustrating examples of a screen displayed on the mobile terminal 700. FIG. 7 is a diagram illustrating a function selection screen for allowing the user to select a function to be prepared in advance in order to register the setting information in advance. Radio buttons for selecting "copy", "scan", "print" and "application" are displayed on the function selection screen. This setting screen is associated with URLs as described above. The contents set through this setting screen are stored as the setting contents in the setting contents illustrated in FIG. 5.

If the user selects a function with the radio button on the function selection screen and selects an OK button, the setting screen of FIG. 8 is displayed. FIG. 8 is a color setting screen for scanning. Radio buttons for selecting "color", "scale", "monochrome", and the like are displayed on the color setting screen. This setting screen is associated with URLs as described above. The contents set through this setting screen are stored as the setting contents in the setting contents illustrated in FIG. 5.

If the user selects one of the radio buttons on the color setting screen and selects a send button, the mobile terminal 700 transmits the setting information (operation ID, order, URL, setting content) and the priority to the setting information management server 600. It is to be noted that a priority order setting screen is omitted.

Next, an example of the list display will be described. The example of the list display described below is an example of display if the priority and functions are those illustrated in FIG. 6. In addition, in the list display, the setting information in a higher display position has a higher priority.

FIG. 9 is a diagram illustrating an example of the list display if all setting information is displayed. In the example of the list display of FIG. 9, operation IDs 1, 3, and 2 are displayed in descending order of priority. FIG. 10 is a diagram illustrating an example of the list display if a change due to the manual feed tray is detected. If a change due to the manual feed tray is detected, the corresponding functions are copy and print, and accordingly, the setting information for scan is eliminated. Therefore, in the example of the list display of FIG. 10, operation IDs 1 and 2 are displayed in descending order of priority. FIG. 11 is a diagram illustrating an example of the list display in which the setting information applied in the executed job is not displayed in the list display. The priority of operation ID 2 is "−1". Therefore, the setting information of operation ID 2 is the setting information applied in the executed job. Therefore, in the example of list display of FIG. 11, operation IDs 1 and 3 are displayed in descending order of priority.

In the display examples of FIGS. 9, 10, and 11, only the operation IDs and functions are displayed, but other information such as the setting contents may be displayed. In this way, the image forming apparatus 100 determines the display mode of the list display according to the priority assigned to the setting information or whether the job applying the setting information is executed.

Figure 12:
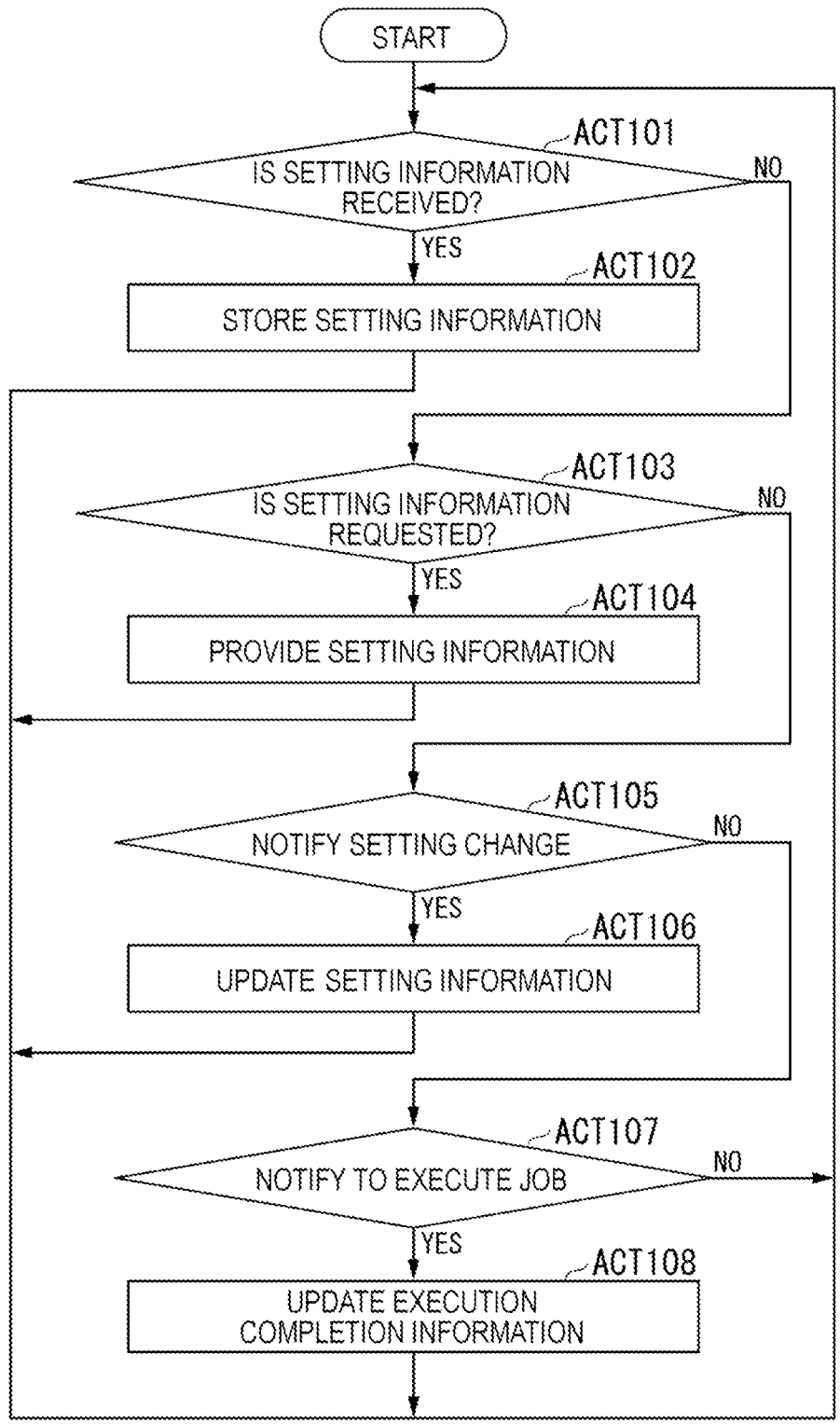
FIG. 12 is a flowchart illustrating a flow of processing by a setting information management server.

The flow of processing by the setting information management server 600 will be described based on the configuration described above. FIG. 12 is a flowchart illustrating the flow of processing by the setting information management server 600. The setting information management server 600 determines whether the setting information is received from the mobile terminal 700 (ACT 101). If the setting information is received (ACT 101: YES), the setting information management server 600 stores the setting information in the setting information database (ACT 102) and the process returns to ACT 101. It is to be noted that ACT 101 also acquires the priority of the setting information from the mobile terminal 700. Therefore, the setting information management server 600 also stores additional information.

If the setting information is not received (ACT 101: NO), the setting information management server 600 determines whether the setting information is requested from the image forming apparatus 100 (ACT 103). At this time, the image forming apparatus 100 requests the setting information together with the user ID of the user. As described above, since the setting information database is provided for each user, the setting information management server 600 provides the setting information corresponding to the user ID to the image forming apparatus (ACT 104), and the process returns to ACT 101. At this time, not only the setting information but also the additional information and the execution completion information corresponding to the user ID are provided.

If the setting information is not requested (ACT 103: NO), the setting information management server 600 determines whether a setting change notification is received from the image forming apparatus 100 (ACT 105). At this time, the image forming apparatus 100 notifies the user ID, the operation ID corresponding to the setting information of the changed setting, and the setting information. If a setting change notification is received from the image forming apparatus 100 (ACT 105: YES), the setting information management server 600 updates the setting information corresponding to the user ID and the operation ID according to the received setting information (ACT 106), and the process returns to ACT 101.

If the setting information is not requested (ACT 105: NO), the setting information management server 600 determines whether a job execution notification is received from the image forming apparatus 100 (ACT 107). If the job execution notification is not received (ACT 107: NO), the process returns to ACT 101. The job execution notification is a notification indicating that a job applying the setting information is executed, and the user ID and the operation ID are notified. If the job execution notification is received from the image forming apparatus 100 (ACT 107: YES), the setting information management server 600 updates the execution completion information corresponding to the user ID and the operation ID (ACT 108), and the process returns to ACT 101.

Figure 13:
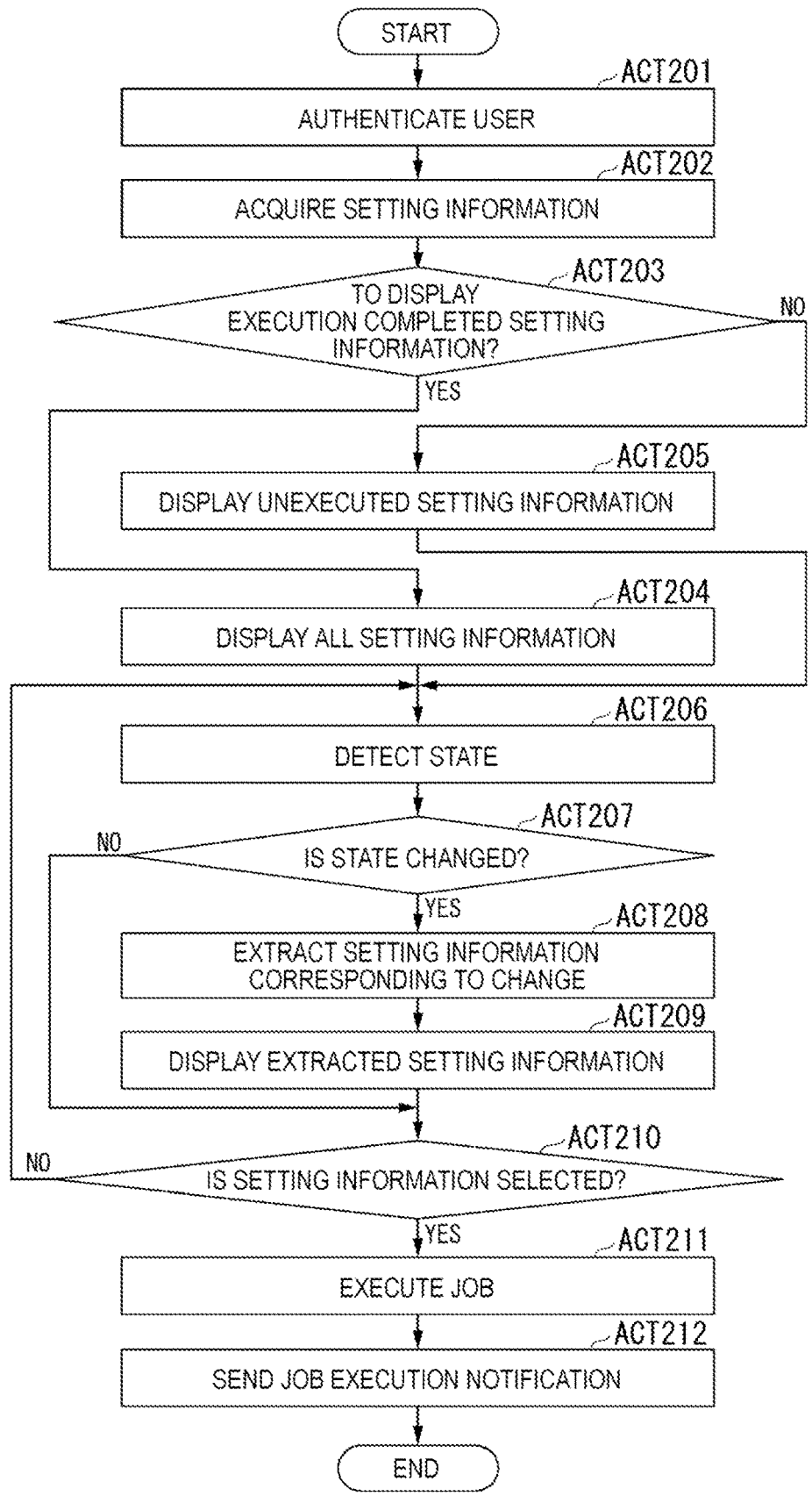
FIG. 13 is a flowchart illustrating a flow of processing by the image forming apparatus.

Next, the flow of processing by the image forming apparatus 100 will be described. FIG. 13 is a flowchart illustrating the flow of processing by the image forming apparatus 100. The image forming apparatus 100 first performs user authentication (ACT 201). At this time, the LDAP server 900 performs the user authentication. It is assumed that the user authentication is successful. If the user authentication fails, the following processes are not executed.

The image forming apparatus 100 acquires setting information by transmitting a setting information request to the setting information management server 600 (ACT 202). At this time, the image forming apparatus 100 requests the setting information together with the user ID of the authenticated user. As described above, the image forming apparatus 100 acquires the additional information corresponding to the user ID and the execution completion information in addition to the setting information.

The image forming apparatus 100 that acquires the setting information determines whether to display the execution completed setting information (ACT 203). Whether to display the execution completed setting information is set by the user in advance, and the setting contents are stored in the HDD 300. Therefore, the image forming apparatus 100 can determine whether to display the execution completed setting information by referring to the setting content.

If the execution completed setting information is to be displayed (ACT 203: NO), the image forming apparatus 100 displays a list display including all setting information (ACT 204), and proceeds to ACT 206. Meanwhile, if the execution completed setting information is not to be displayed (ACT 203: YES), the image forming apparatus 100 displays a list display including only the unexecuted setting information (ACT 205), and proceeds to ACT 206. In either case, the image forming apparatus 100 determines whether execution is completed according to whether the priority is positive or negative.

The image forming apparatus 100 detects a change in the state of the image forming apparatus 100 caused by the user (ACT 206). For example, the change in the state, such as whether the sheet is placed on the ADF or not, can be detected by another task, and the detection result can be used to detect the state.

The image forming apparatus 100 determines whether the state is changed (ACT 207). If the state is not changed (ACT 207: NO), the process proceeds to ACT 210. If the state is changed (if the application receives an event from the image forming apparatus 100) (ACT 207: YES), the operation ID corresponding to the change is extracted, thereby extracting the setting information corresponding to the change (ACT 208). The image forming apparatus 100 displays a list display of only the extracted setting information (ACT 209). As described above, the image forming apparatus 100 determines the display mode of the list display according to the detected change in the state of the image forming apparatus 100.

The image forming apparatus 100 determines whether the user selects the setting information from the list display (ACT 210). If the setting information is not selected (ACT 210: NO), the process returns to ACT 206. If the setting information is selected (ACT 210: YES), upon receiving a job execution instruction from the user, the image forming apparatus 100 executes the job that applies the selected setting information (ACT 211).

Since the job applying the setting information is executed, the image forming apparatus 100 transmits a job execution notification to the setting information management server 600 (ACT 212), and ends the process.

As described above, according to the present embodiment, the user can register the setting information in the mobile terminal 700 in advance, thereby improving usability. This is because, while a plurality of users cannot register at the same time when setting directly in the image forming apparatus 100, a plurality of users can register at the same time as users are able to register using the mobile terminal 700.

In addition, in the present embodiment, since the setting information can be prevented from being displayed in the list display if the job applying the setting information is executed, and usability can be improved. For example, it is assumed that the user intends to register setting information A, B, C, D, and E in advance and execute jobs in this order. At this time, since the setting information A is unnecessary after the job applying the setting information A is executed, the setting information will be the unnecessary information next time when applying the setting information B. Therefore, by not displaying the setting information A, the user does not see the unnecessary setting information, and the setting information B can be easily selected.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
a processing circuit configured to:
acquire setting information registered in advance by a user, the setting information including a priority assigned to a plurality of functions of the image forming apparatus, the plurality of functions including at least two of printing, scanning, or copying;
determine a display mode of a list display of the setting information according to the priority; and
control a display device to display the list display based on the display mode;
wherein the processing circuit is configured not to display the setting information in the list display if a job applying the setting information is executed.

2. The apparatus according to claim 1, wherein the processing circuit is configured to display the setting information as the setting information with a lowest priority assigned thereto if a job applying the setting information is executed.

3. The apparatus according to claim 1, further comprising the display device.

4. An image forming apparatus comprising:
a processing circuit configured to:
acquire setting information registered in advance by a user;
detect a change in a state of the image forming apparatus caused by the user, the change in the state of the image forming apparatus including a manual feed tray being pulled out;
determine a display mode of a list display of the setting information according to a priority assigned to the setting information and the change in the state of the image forming apparatus; and
control a display device to display the list display based on the display mode.

5. The apparatus according to claim 4, wherein the change in the state of the image forming apparatus includes a sheet being placed on or in an auto document feeder or platen glass of a scanner.

6. A non-transitory computer-readable medium that stores a program for causing a computer of an image forming apparatus to:
acquire setting information registered in advance by a user, the setting information including a priority assigned to a plurality of functions of the image forming apparatus;
determining a display mode of a list display of the setting information according to the priority; and
control a display device to display the list display based on the display mode;
wherein the program causes the computer to display the setting information as the setting information with a lowest priority assigned thereto if a job applying the setting information is executed.

7. The non-transitory computer-readable medium according to claim 6, wherein the program causes the computer not to display the setting information in the list display if a job applying the setting information is executed.

8. The non-transitory computer-readable medium according to claim 6, wherein the program causes the computer to:
detect a change in a state of the image forming apparatus caused by the user; and
determine the display mode of the list display of the setting information according to the priority assigned to the setting information and the change in the state of the image forming apparatus.

9. The non-transitory computer-readable medium according to claim 8, wherein the change in the state of the image forming apparatus includes a manual feed tray being pulled out.

10. The non-transitory computer-readable medium according to claim 8, wherein the change in the state of the image forming apparatus includes a sheet being placed in an auto document feeder.

11. The non-transitory computer-readable medium according to claim 8, wherein the change in the state of the image forming apparatus includes a sheet being placed on platen glass of a scanner.

12. The non-transitory computer-readable medium according to claim 6, wherein the plurality of functions include at least two of printing, scanning, or copying.

* * * * *